Figure 1:
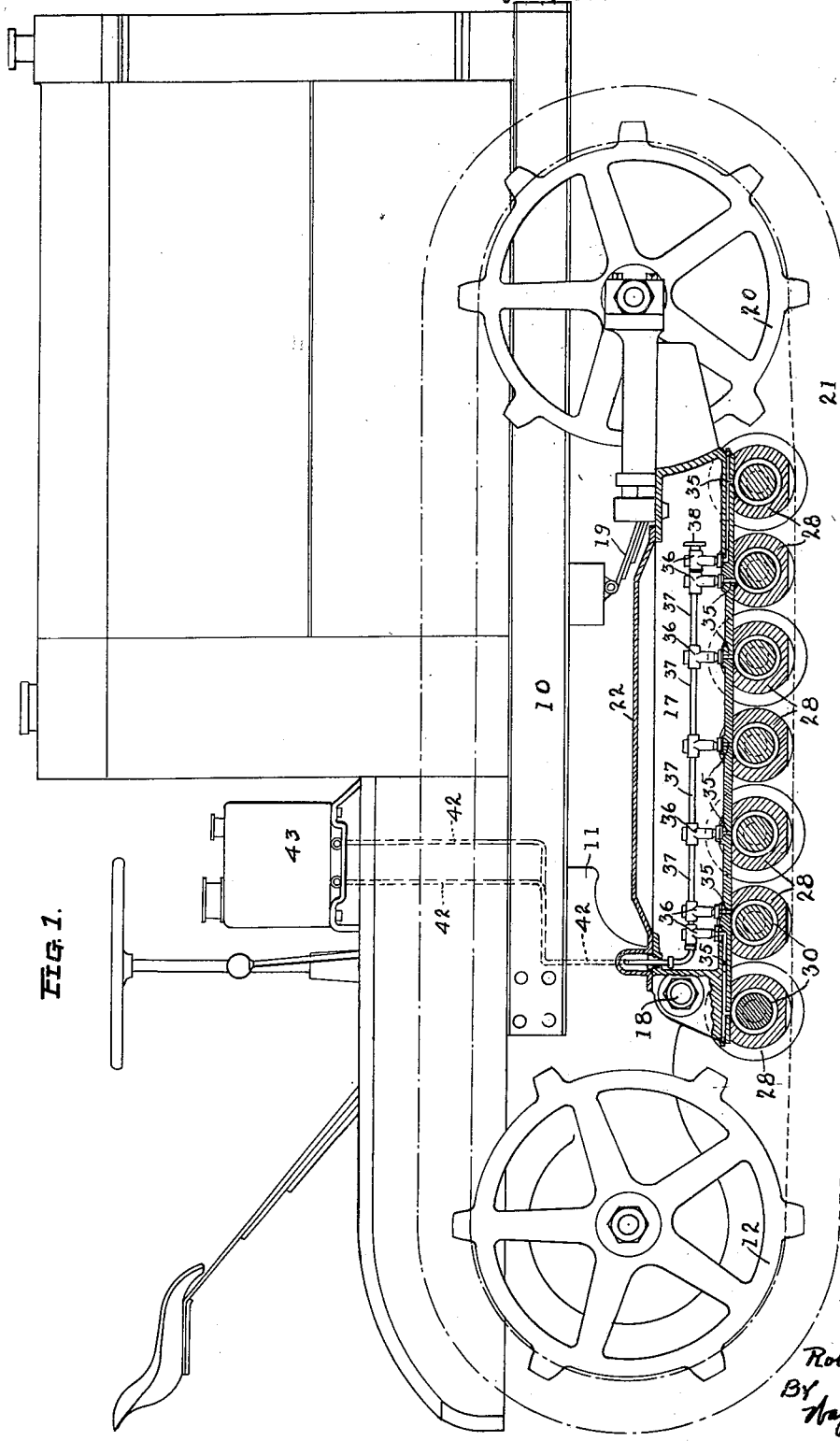

Nov. 27, 1928.

R. H. WHITE 1,693,214

LUBRICATING SYSTEM

Filed July 25, 1925

3 Sheets-Sheet 1

INVENTOR
Rollin H. White
BY
Wayne M. Hart
ATTORNEY

Nov. 27, 1928.
R. H. WHITE
1,693,214
LUBRICATING SYSTEM
Filed July 25, 1925    3 Sheets-Sheet 2
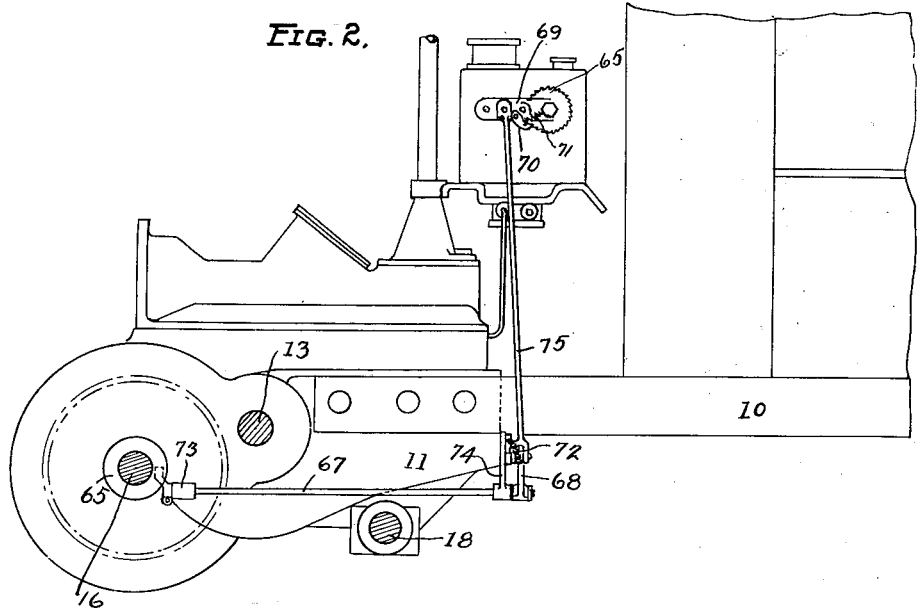
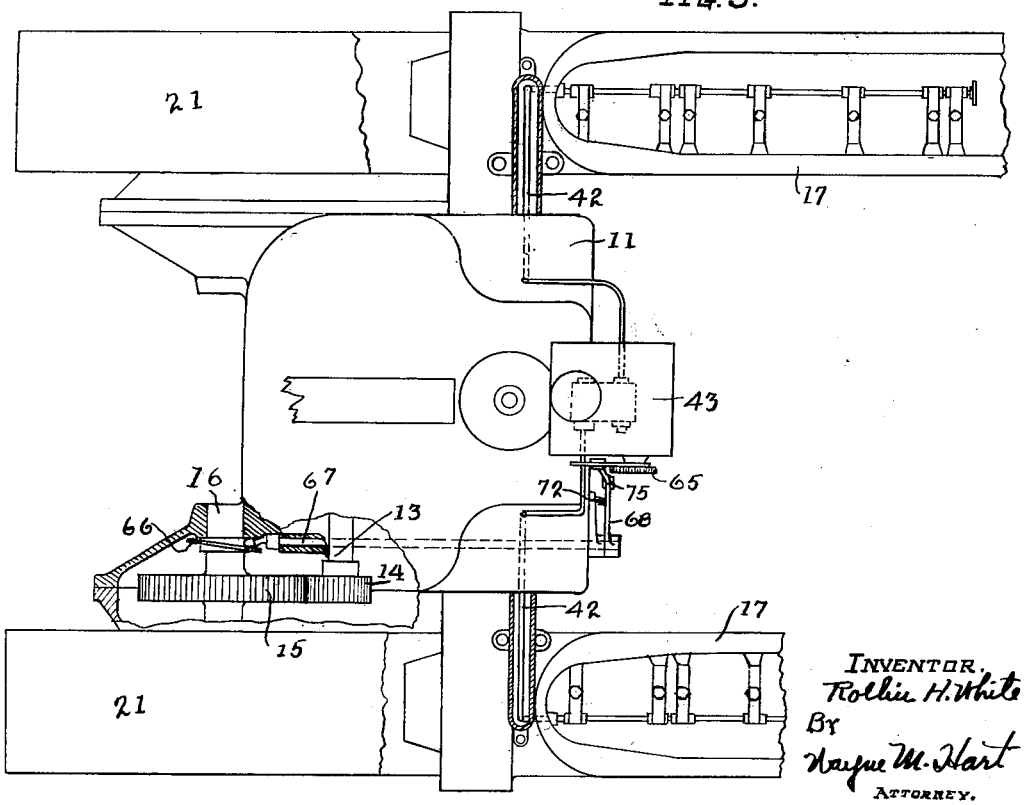
INVENTOR.
Rollin H. White
By
Wayne M. Hart
ATTORNEY.

Nov. 27, 1928. 1,693,214
R. H. WHITE
LUBRICATING SYSTEM
Filed July 25, 1925   3 Sheets-Sheet 3
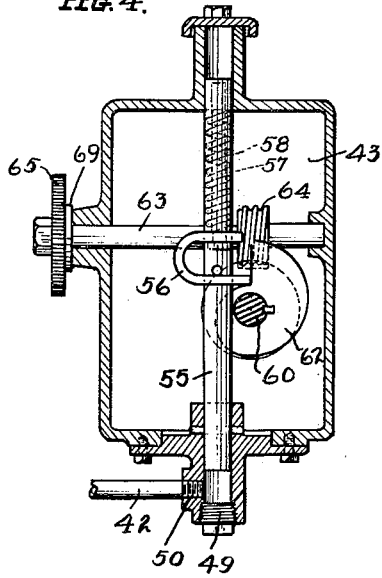
FIG. 4.
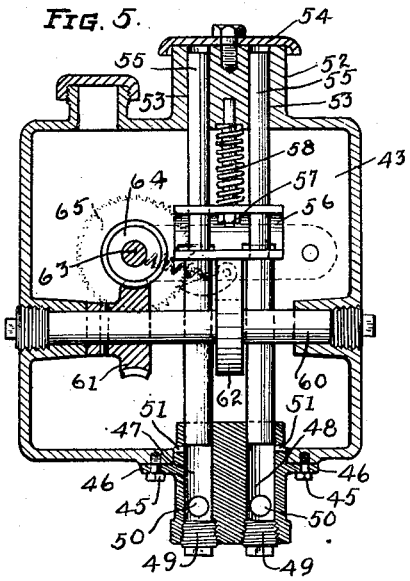
FIG. 5.
FIG. 6.
INVENTOR
Rollin H. White
BY
Wayne M. Hart
ATTORNEY Patented Nov. 27, 1928.

1,693,214

UNITED STATES PATENT OFFICE.

ROLLIN H. WHITE, OF CLEVELAND HEIGHTS, OHIO.

LUBRICATING SYSTEM.

Application filed July 25, 1925. Serial No. 46,183.

This invention relates to lubricating systems and more particularly to the type which can be employed for the track rollers which support a track-laying tractor upon endless tracks.

It is customary to provide each track roller with a lubricating system which can be individually replenished with lubricant when necessary. With such system, the lubricant is supplied directly to the roller bearing by manual application or through a conduit by means of pressure. The supplying of lubricant individually to the rollers requires considerable time, and the operator must maintain a constant observation of each roller bearing to know when it is time to replenish the lubricant supply. Due to this human element, the rollers often run dry causing wear of the rotating parts which results eventually in replacement.

An object of my invention is to provide a lubricating system for the track rollers of a track-laying vehicle in which lubricant can be supplied to all of the roller bearings simultaneously by a single injection.

A further object of my invention is to provide a lubricating system which is automatically operated, during the operation of a track-laying tractor, to periodically supply lubricant to all of the track roller bearings simultaneously.

Another object of my invention resides in providing a connected conduit system through which lubricant can be supplied from a common source to all of the track roller bearings of a track-laying tractor simultaneously.

These and other objects and an embodiment of the invention will appear in the following specification.

In the accompanying drawings, Figure 1 is a side elevation of a track-laying tractor with which my invention is associated, the truck frame being in section to show the lubricating conduits associated with the track rollers; Figure 2 is a fragmentary side elevation of the rear end of the tractor illustrating the lubricant reservoir and pump operating mechanism; Figure 3 is a fragmentary top plan view of the rear end of the tractor partially in section, with the lubricating system associated therewith; Figure 4 is a vertical section through the lubricant reservoir showing the pump associated therewith; Figure 5 is another vertical sectional view of the same; and Figure 6 is a vertical sectional view through one of the truck frames and one of the track rollers with the inlet conduit leading to the bearing.

The lubricating system which forms the subject of this invention can be associated with any type of track-laying tractor which is provided with stationary rotatable track rollers. In the tractor shown in the drawings, 10 represents the main frame which carries a motor at its forward end and a transmission casing 11 at its rear end. The transmission casing carries suitable gearing through which power is transmitted from the engine to the track driving sprockets 12 located one on each side of the main frame. The transmission includes shafts 13 each carrying a driving gear 14 which mesh with gears 15 secured to stub shafts 16 upon which the sprockets 12 are secured.

A truck frame 17 is pivotally connected at 18, at its rear end, to the transmission casing 11 on each side of the main frame, and springs 19 connect the forward end of the truck frames with the main frame. An idler sprocket 20 is carried at the forward end of each truck frame, and an endless track 21 extends around the sprockets 12 and 20 on each side of the tractor, exteriorly of the truck frames.

The truck frames, illustrated, each consist of a single casting which is provided with a longitudinally extending recess in their upper face to provide a housing for accommodating the lubricant conducting conduits. A cover plate 22 is secured over each of the recesses by bolts 23 to enclose the conduits housed within the truck frames. A plurality of track rollers are rotatably carried by the truck frames. Bearings consisting of two parts, 24 and 25, are secured to the under side of the truck frame by bolts 26 and shafts 27 are rotatably carried therebetween. The ends of the shafts 27 project beyond the sides of the bearings and roller sections 28 are keyed thereto, suitable means such as nuts 29 being provided on the ends of the shafts to retain the roller sections on the shafts. The roller sections are spaced, and the rollers are arranged in longitudinal alignment, providing bearing surfaces which have rolling contact with the rail portions of the endless tracks which pass thereunder. The two part bearings are provided with an annularly extending control recess 30 which receive the enlarged portions 31 of the shafts 27 and provide a thrust bearing therefor. The ends 32 of the two part bearings are annular and of reduced diameter, and the track roller sections are provided with a central recess 33 in their inner faces so that they can be assembled to telescope the reduced end portions of the bearings. Suitable dust excluding washers 34 are provided intermediate the ends of the bearings and the interior face of the track roller recessed faces.

The base of the truck frames is provided with a plurality of passages 35 extending therethrough over each track roller assembly and are arranged in open communication with the annular recesses in the two part axle carrying bearings. A T conduit coupling 36 is secured with the truck frame, in communication with each of the passages 35, and are joined together in a continuous conduit by pipe sections 37.

A valve can be provided in the forward end 38 of the end coupling so that the conduits can be relieved of any air which may accumulate therein. The conduits formed by the couplings 36 and the connecting pipes 37 are located within the recessed portion of the truck frames and are enclosed by the removable cover plate 22 so that access can be readily had for assembly and inspection. The couplings 36 are seated in a recess in the truck frames, and are secured in position by plates 39 which are seated on bosses 40 within the recessed portion of the truck frame and on the top of the couplings. The plates are clamped in such position by bolts 41 which are screwed into the base of the truck frames. An open lubricant conducting conduit is provided for each truck frame by the couplings and pipes, which is rigidly carried by the truck frames, and which is in open communication with all of the passages 35 extending through the truck frames and in open communication with the axles 27 and their carrier bearings in which they rotate. The lubricant will flow along the shafts on each side of the enlarged portions 31 and pass around the ends thereof and work out from the inner sides of the roller sections. This manner of lubricant flow will prevent dust and dirt from entering between the bearing faces of the axles 27 and the bearings in which they rotate.

The conduits of each truck frame are provided with lubricant inlets, and I prefer to connect them with a common lubricant reservoir and with mechanism operated by the tractor propelling mechanism so that charges will be automatically injected periodically to each of the roller axle bearings simultaneously.

Inlet conduit sections 42 lead from a lubricant reservoir 43 to the end couplings 36 of the conduit in each truck frame, and such inlet sections are positioned and provided with suitable joints so that the rocking of the truck frames on their pivots will not effect the passage of lubricant therethrough.

The reservoir 42 is provided with an opening in its base which an outlet member 44 extends in, and is secured by bolts 45 extending through the flanges 46 into the reservoir base. The outlet member is provided with two cylinders 47 and 48 which extend vertically therethrough and are closed at their lower end by plugs 49. The conduit inlet pipes 42 are secured in open communication with transversely extending passages 50 leading from the lower end of the cylinders. The outlet member is also provided with transversely extending passages 51, within the reservoir, through which lubricant will flow by gravity from the reservoir into the cylinders 47 and 48.

The inlet conduit 42 has a considerable length extending laterally parallel to the pivot 18 for the truck frames 17 and is provided with sufficient slack whereby such length of conduit may yield slightly upon movement of the truck frame about its pivot, all that is required, by virtue of its position adjacent the pivoting axis of the truck frames. The danger of breaking the conduits 42 by continual twisting thereof is thus eliminated and this result is contributed to, largely, by the provision of the construction described wherein only a single conduit is led from each truck frame to supply a lubricant through a plurality of branch conduits to the plurality of track rollers thereof, and its disposition adjacent the pivotal point of the truck frame.

A channel guard 76 is secured to each truck frame and projects within the transmission casing 11 to protect the laterally extending portions of the conduits 42 from being struck by extraneous objects over which the tractor is passed, since because of the low position of such lateral conduit portion required in order to keep it near the pivot point 18, otherwise it would be destroyed by being struck by stumps, branches, rocks or other extraneous objects over which the tractor is passed.

The reservoir is provided with a boss 52 above the outlet, in which cylinders 53 are formed, and a removable cap 54 encloses the upper end of such cylinders. A pair of pistons 55 are slidably mounted in the cylinders 53 in the boss and the cylinders 47 and 48 in the outlet member. A transversely extending U-shaped yoke member 56 is keyed to the pistons so that they will move in unison, and a bolt 57 extends through and is secured to the upper plate of the yoke and is slidably mounted in a recess in the boss 52. A spring 58 extends around the bolt 57 intermediate the bottom of the boss and the upper plate of the yoke. The spring exerts a downward pressure upon the yoke which is sufficient to move the pistons downward to provide sufficient pressure to force the lubricant in the cylinders 47 and 48 through the lubricant conducting conduits leading therefrom and from the conduits into the roller bearings.

A shaft 60 extends across the interior of the reservoir and is rotatably mounted in bearings formed in the walls of the reservoir. The shaft 60 has keyed thereto a driving gear 61, and a cam 62 which is arranged to bear against the bottom plate of the yoke member 56, intermediate the two pistons. A shaft 63 is rotatably mounted in bearings and extends across the reservoir, and carries a gear 64 which meshes with the gear 61 on the shaft 60. A gear 65 is secured to an end of the shaft 63 exteriorly of the reservoir and is driven by mechanism which is automatically operated by the tractor transmission mechanism when in operation.

A cam 66 is secured to one of the stub axles 16 of the track propelling mechanism and is arranged to rock a shaft 67 which is arranged with one end in contact therewith. A link 68 is secured to the other end of the rock shaft 67 and connected with a lever 75 which is pivotally connected at its upper end to a lever 69 which is pivotally mounted on the shaft 63, adjacent the gear 65. A dog 70 is carried by the lever 69 and is arranged to engage the teeth of the gear 65, being held in engagement therewith by a coil spring 71. A spring 72 is connected to the lever 68 and the transmission casing 11, to normally maintain the lever 69 in the upper position of its movement, that is, in a position so that the dog will engage another tooth of the gear 65. The shaft 67 is rotatably mounted in bearings 73 and 74 connected with the transmisison casing 11.

When the stub axles are rotated, the cam 66 will rotate therewith and effect a rocking of the lever 67 on each rotation thereof. The rocking of shaft 67 also rocks the link 68 secured thereto, and such link effects a reciprocation of lever 75 which in turn, on its down stroke, moves the dog 70 therewith. The dog having a pawl and ratchet effect with the gear 65 will rotate the gear during its downward movement and will travel back over the gear to engage another tooth during the upward movement with the lever 69. The spring 71 retains the dog in engagement with the gear. The dog thus rotates the gear a predetermined degree, depending upon the relation of the levers, at each rotation of the stub axle 16, and the gear 65 in turn will rotate the shaft 63 and gear 64 therewith. The same movement is imparted to the gear 61 and the shaft 60 and cam 62. The cam revolving periodically against the yoke will gradually raise the yoke until the pistons carried thereby reach their top position in the cylinders permitting a full charge of lubricant to flow therein, whereupon further rotation of the cam releases the yoke and permits the spring 58 to move the yoke and plungers to a point adjacent the bottom of the cylinders, thus forcing the charge of lubricant in the cylinders through the inlet pipes and the conduits and creating a pressure which forces the lubricant through all of the passages 35 to the axles 27 and their bearings.

It will be seen that there will be several rotations of the stub axle to complete the upward stroke of the pistons, so that charges are delivered periodically, and the mechanism can be arranged to time the injections as desired. Other suitable means could be employed to automatically operate the plungers for forcing the lubricant through the conduits simultaneously, and a reservoir could be arranged for the conduit of each truck frame.

With the structure described, the track roller bearings are simultaneously lubricated automatically at predetermined periods of time while the tractor is propelled. The movement of the lubricant is such as to exclude the entrance of any dirt, dust or other foreign matter which could act as an abrasive to the roller bearings.

Various changes can be made in the structure illustrated and described without departing from the spirit of my invention and the scope of the appended claims.

What I claim is:

1. In a track laying tractor, the combination with a pair of laterally disposed longitudinally extending track frames, track rollers carried by the track frames, a chassis frame for the tractor disposed above the level of the track frames, a lubricant reservoir supported upon the chassis frame, a plurality of branch lubricant conduits for each track frame, each of which is adapted to conduct lubricant to a track frame roller, a main conduit for each track frame extending longitudinally thereof, said track frame comprising a housing enclosing said main conduit and branch conduits, said track frames adapted to oscillate about an end pivot during operation of the tractor, said main conduits having an inlet portion extending laterally of the tractor frame closely adjacent and substantially parallel to the pivotal axis of the track frame, said inlet portions adapted to communicate lubricant from the reservoir to the respective main conduits for the track frames.

2. In a track laying tractor, the combination with a pair of laterally disposed longitudinally extending track frames, track rollers carried by the track frames, a chassis frame for the tractor disposed above the level of the track frames, a lubricant reservoir supported upon the chassis frame, a plurality of branch lubricant conduits for each track frame, each of which is adapted to conduct lubricant to a track frame roller, a main conduit for each track frame, said track frame comprising a housing enclosing said main conduit and branch conduits, said track frames adapted to oscillate about an end pivot during operation of the tractor, said main conduits having an inlet portion extending laterally of the track frame closely adjacent to the pivotal axis of the track frame, said inlet portions adapted to communicate lubricant from the reservoir to the respective main conduits for the track frames.

3. In a track laying tractor, the combination with a pair of laterally disposed longitudinally extending track frames, track rollers carried by the track frames, a chassis frame for the tractor disposed above the level of the track frames, a lubricant reservoir supported upon the chassis frame, a plurality of branch lubricant conduits for each track frame, each of which is adapted to conduct lubricant to a track frame roller, a main conduit for each track frame extending longitudinally thereof, said track frame comprising a housing enclosing said main conduit and branch conduits, said track frames adapted to oscillate about an end pivot during operation of the tractor, said main conduits having an inlet portion extending laterally of the track frame closely adjacent and substantially parallel to the pivotal axis of the track frame, said inlet portions adapted to communicate lubricant from the reservoir to the respective main conduits for the track frames, and channel shaped guards for the laterally extending lubricant inlet portions supported by the respective track frames and extending laterally thereof.

4. In a track laying tractor, the combination with a longitudinally extending track frame, track rollers carried by the track frame, a chassis frame for the tractor disposed above the level of the track frame, a lubricant reservoir supported upon the chassis frame, a plurality of branch lubricant conduits for the track frame, each of which is adapted to conduct lubricant to a roller, a main conduit for the track frame extending longitudinally thereof, said track frame comprising a housing enclosing said main conduit and branch conduits, said track frame adapted to oscillate about an end pivot during operation of the tractor, said main conduits having an inlet portion extending laterally of the tractor frame closely adjacent and substantially parallel to the pivotal axis of the track frame, said inlet portions adapted to communicate lubricant from the reservoir to the respective main conduits for the track frame.

5. In a track laying tractor, the combination with a longitudinally extending track frame, track rollers carried by the track frame, a chassis frame for the tractor disposed above the level of the track frame, a lubricant reservoir supported upon the chassis frame, a plurality of branch lubricant conduits carried by the track frame, each of which is adapted to conduct lubricant to a roller, said track frame adapted to oscillate about an end pivot during operation of the tractor, and a main conduit having a portion extending into the tractor frame at a point closely adjacent and substantially parallel to the pivotal axis of the track frame, said portions adapted to communicate lubricant from the reservoir to the respective branch conduits for the track frame.

In testimony whereof, I hereunto affix my signature.

ROLLIN H. WHITE.